(No Model.)

H. E. RICKER.
CAR COUPLING.

No. 460,382.   Patented Sept. 29, 1891.

Witnesses
J. Edw. Maybee
W. G. McMillan

Inventor
Henry E. Ricker
by Donald C. Ridout & Co
Attys.

UNITED STATES PATENT OFFICE.

HENRY E. RICKER, OF MEADOWVALE, ASSIGNOR OF ONE-THIRD TO THOMAS RICHARD EARNGEY, OF BRAMPTON, CANADA.

CAR-COUPLING.

SPECIFICATION forming part of Letters Patent No. 460,382, dated September 29, 1891.

Application filed March 5, 1891. Serial No. 383,823. (No model.)

*To all whom it may concern:*

Be it known that I, HENRY E. RICKER, of the village of Meadowvale, in the county of Peel, in the Province of Ontario, Canada, have invented a certain new and useful Improvement in Car-Couplers, of which the following is a specification.

The object of the invention is to provide an attachment which may be easily applied to any ordinary draw-head, by which attachment the link of one draw-head may be guided into the draw-head next to it; and it consists of a pivoted bail placed in such a position in relation to the draw-head that it may be made to automatically support the link at any desired angle to suit the position of the draw-head into which it is to be guided, as hereinafter described, and then definitely claimed, as and for the purpose specified.

Figure 1:
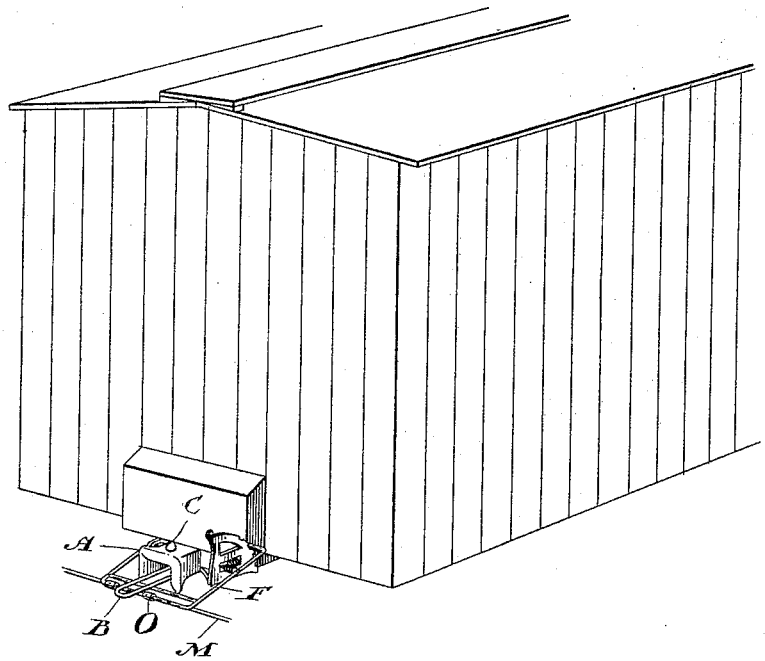
Figure 2:
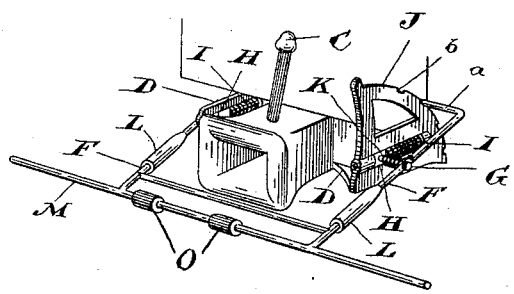

Figure 1 is a perspective view showing the end of a box-car provided with an ordinary draw-head having my attachment applied. Fig. 2 is an enlarged view of the draw-head and attachment.

In the drawings, A represents the draw-head which, so far as my attachment is concerned, may be of any pattern desired.

B is an ordinary link, and C is an ordinary coupling-pin.

D is a bracket, bolted or otherwise secured in the position indicated.

F is a bail, each end of which is pivoted on a pin G, projecting from the block H, placed upon a spindle suitably supported one on each end of the bracket D. A spring I is placed behind each block H. The springs I hold the blocks H forward in the position indicated in the drawings, but permit them to be pushed back when required for the purpose hereinafter explained. One end of the bail F has a tail *a* extending behind the pin G. This bail is bent to extend over the quadrant J, formed on one end of the bracket D. This quadrant has notches *b* made in it, to which notches the tail *a* is designed to fit, so as to hold the bail F at any desired angle. On each pin G a torsion-spring K is placed and arranged to act upon the bail F, so as to cause it to spring down when not held stationary by its tail *a* fitting into one of the notches *b*. In order to accommodate the different lengths of draw-heads I prefer to divide the arms of the bail F and connect the divided parts by a right and left hand nut L or by any other means, so that the length of the bail F may be readily adjusted to suit the length of the particular draw-head to which it at the time may be applied. The bail F may be provided with a handle M, extending to the outside of the car in order that it may be operated from the side of the car. From this description the construction and application of my attachment will be understood.

A draw-head provided with my attachment may be coupled to any ordinary link draw-head without the necessity of any one placing his hands between the draw-head, as the link B is supported and guided by the bail F.

When it is desired to effect a coupling, a coupling-pin G is set in the position indicated in Fig. 2, a bail F is pushed back so that its tail *a* shall be clear of the notches *b* formed in the quadrant J, and is then adjusted so as to support the link B at the desired angle, when the tail *a* is permitted to engage with the notch *b*, which will hold the said bail at the desired angle. As the draw-heads come together, the draw-head into which the link is to be guided comes in contact with the bail F and pushes it back, so that its tail *a* shall be clear of the notch *b*, into which it may at the time be fitted. Immediately that the bail F is thus released the spring K draws it down out of the way of the draw-heads, which in coming in contact with each other shake the pin C down into the position which is indicated in Fig. 1, thereby locking the link B. I prefer to place friction-rollers O on the bail F in such position as to come in contact with the draw-head, thereby preventing the friction which might be caused by such contact.

From this description it will be seen that my attachment is applicable to any kind of draw-head, and by this appliance the coupling of cars may be effected without danger to the brakeman.

What I claim as my invention is—

1. The combination, with a draw-head, of a swinging pivoted bail arranged to guide the link to the opposite draw-head and means to support said bail in different positions, substantially as described.

2. The combination, with a draw-head, of a notched quadrant and a pivoted bail, said bail having a tail arranged to engage with the notches of the quadrant, substantially as described.

3. A bail F, pivoted on the pins G, projecting from the blocks H, which are adjustably supported by the bracket D and actuated by the springs I, in combination with a quadrant J, having the notches $b$ made in it to receive the tail $a$ of the bail F, substantially as and for the purpose specified.

4. A bail F, pivoted on the pins G, projecting from the blocks H, which are adjustably supported by the bracket D and actuated by the springs I, in combination with the spring K, tail $a$, notches $b$, made into the quadrant J, substantially as and for the purpose specified.

5. An extensible bail F, pivoted on the pins G, projecting from the blocks H, which are adjustably supported by the bracket D and actuated by the springs I, in combination with the spring K, tail $a$, notches $b$, made into the quadrant J, substantially as and for the purpose specified.

Meadowvale, February 3, 1891.

HENRY E. RICKER.

In presence of—
J. S. BROWN,
B. F. JUSTIN.